(12) United States Patent
Scott

(10) Patent No.: US 7,512,905 B1
(45) Date of Patent: Mar. 31, 2009

(54) HIGHLIGHT LINKED-TO DOCUMENT SECTIONS FOR INCREASED READABILITY

(75) Inventor: John J. R. Scott, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/056,974

(22) Filed: Mar. 27, 2008

(51) Int. Cl.
G06F 3/048 (2006.01)
(52) U.S. Cl. .................... 715/855; 715/713; 715/805
(58) Field of Classification Search .............. 715/760, 715/712, 713, 784, 785, 802, 805, 854, 855
See application file for complete search history.

(56) References Cited

U.S. PATENT DOCUMENTS

| | | | |
|---|---|---|---|
| 6,031,989 A | 2/2000 | Cordell | |
| 6,094,529 A | 7/2000 | Jeffries et al. | |
| 6,457,026 B1 * | 9/2002 | Graham et al. | 715/234 |
| 2002/0154177 A1 * | 10/2002 | Barksdale et al. | 345/853 |

* cited by examiner

*Primary Examiner*—Ba Huynh
*Assistant Examiner*—Enrique W Iturralde
(74) *Attorney, Agent, or Firm*—Scully, Scott, Murphy & Presser, P.C.; Robert E. Straight, II, Esq.

(57) ABSTRACT

A method of highlighting linked-to document sections for increased readability uses standard <h1>, <h2> . . . <h6> tags or like to identify different sections within a page, and then highlights from the beginning of a newly-linked-to section up to the beginning of the next section that has an equivalent header tag or a header tag which is higher in the tag hierarchy.

2 Claims, 2 Drawing Sheets

HIGHLIGHT LINKED-TO DOCUMENT SECTIONS FOR INCREASED READABILITY

FIELD OF THE INVENTION

The present application relates to authoring of computer readable electronic documents, and more particularly to a method that highlights linked-to document sections.

BACKGROUND OF THE INVENTION

Web browsers have the ability to link into particular sections of a HTML document by using URLs (Uniform Resource Locators) ending in #<id-of-section>. For example, clicking on hyperlinked text from a rendered HTML document may display additional information related to the hyperlinked text on the same display, shifting down the content that was displayed after the hyperlinked text. While this feature is very useful, it is often difficult for the reader to find the end of the section they linked to. This problem also occurs for the top of the section when the section is near the bottom of the document and its height is less than the window height. Normally, the linked-to section would be displayed at the top of the window. However, if the linked-to section is at or very near the bottom of the document the linked-to section may be displayed anywhere in the window, where the user cannot immediately find it. All this makes finding the relevant section difficult.

Thus, what is desirable is a method for discerning, for example, highlighting a linked-to section from the original document. Known techniques such as "selectors" in Cascading Style Sheets (in CSS3) bind style properties to elements/sections of a document in order to solve the similar problem. Known techniques also require special tags to be inserted at various positions in a page, defining when to start the highlighting and when to stop highlighting, which can achieve a similar effect to the method of the present disclosure, but they involve much more complexity for Web page authors or subsequent editing of existing Web pages. For instance, while CSS3 allows new style properties such as highlighting of an identifiable section, it relies on special tags such as nested use of <div> and <span>. In addition, while a page designer may add special tags to be inserted at various positions in a page, defining when to start the highlighting and when to stop highlighting, those tags may be inconsistent with other aspects of their page design, and may not be supported by all browsers.

BRIEF SUMMARY OF THE INVENTION

A method of highlighting linked-to document sections for increased readability is provided. The method in one aspect may comprise retrieving a linked-to tag in a hypertext document being rendered in response to the linked-to tag being selected and determining hierarchical rank of the linked-to tag in relation to a hierarchy of tags in the hypertext document. The method may further include retrieving next tag appearing after said linked-to tag in the hypertext document and having hierarchical rank equal to or greater than the hierarchical rank of the linked-to tag; and highlighting display section from beginning of said linked-to tag to beginning of said next tag. The hypertext document is a standard hypertext document rendered by one or more browsers, said linked-to tag, said next tag, and said hierarchy of tags are standard tags used in said standard hypertext document to identify one or more different sections within said standard hypertext document, and no special tags are needed in the hypertext document to highlight linked-to document sections.

Further features as well as the structure and operation of various embodiments are described in detail below with reference to the accompanying drawings. In the drawings, like reference numbers indicate identical or functionally similar elements.

DETAILED DESCRIPTION

A method in one embodiment of the present disclosure always highlights the linked-to section or sub-section, for example, to promote easy viewing. Highlighting sections enables the reader to easily distinguish the section to which the reader has been directed from the rest of the document. Highlighting may include rendering the segment to be highlighted in different color, font, or format such as underlining or italics or like, or in any other way that would distinguish the segment from the rest of the content on the page.

Highlighting may be implemented, for example, on documents such as formatted HTML documents that are browser rendered, for example, that use heading levels such as H1, H2, etc., to denote section changes. Any other hypertext documents may be highlighted according to the method disclosed in the present disclosure.

In one embodiment, script such as JavaScript™ may be embedded in the HTML document. The script searches for a header component, such as the #<id-of-section> value to find the specific DOM object. The importance of the found header is noted. For instance, in HTML, a header tag with a smaller number is considered more important in one embodiment, thus H2 is more important than H3. All objects after the header are highlighted until either the end of the document is reached, or a header of equal or higher importance is found. For example, if the header found has identifier of H3, then the highlighting stops if a H1, H2, or H3 is encountered.

In one embodiment, the script such as the JavaScript™ and highlighting style information, for example, encoded in CSS (cascading style sheet), may be stored in common files, enabling any documents to access and use the scripts.

Figure 1:
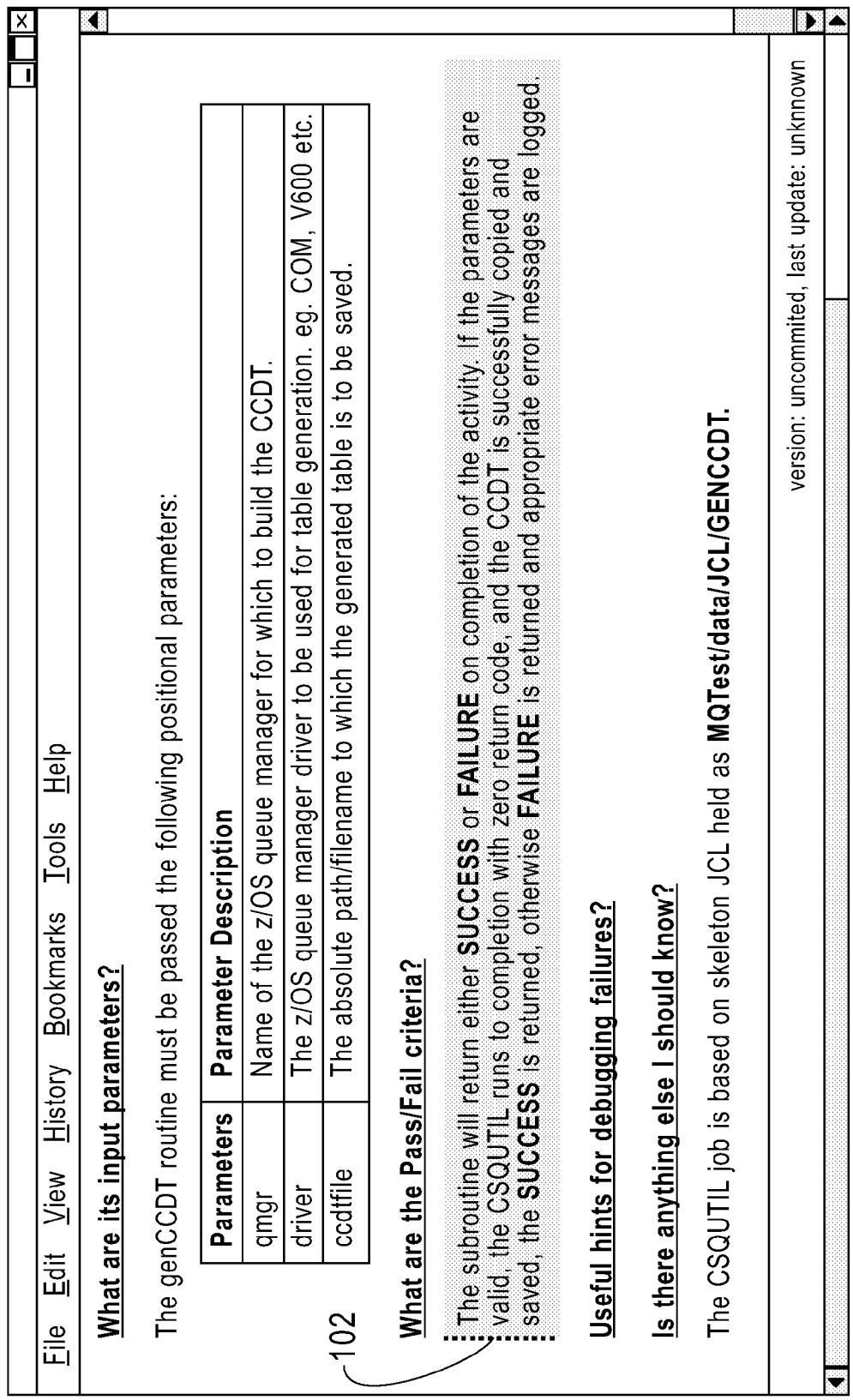
FIG. 1 illustrates a browser-rendered HTML page with highlighted linked-to sections according to the method of the present disclosure in one embodiment.

FIG. 1 illustrates a browser-rendered HTML page with linked-to sections highlighted. In the example, the section of interest is clearly labeled, in this case by a green background and a dotted line in the left margin 102. In this example, both the beginning and end headers are H3s.

Below is an example program in JavaScript™ that performs the task on newly opened documents:

```
var header = document.getElementById(document.location.hash.replace(/^#/,""));
if (header != null && header.nextSibling)
{
  var highlighted = document.createElement("DIV")
  highlighted.style["background"] = "red";
  header.parentNode.insertBefore(highlighted, header.nextSibling);
  max = getHSize(header)
  while (highlighted.nextSibling)
  {
    if (highlighted.nextSibling.nodeType == 1 && max >=
      getHSize(highlighted.nextSibling))
      break;
```

```
    highlighted.appendChild(highlighted.nextSibling);
    }
}
function getHSize(node)
{
    return parseInt(node.nodeName.replace(/^H(\d)$/,"$1"));
}
```

Figure 2:
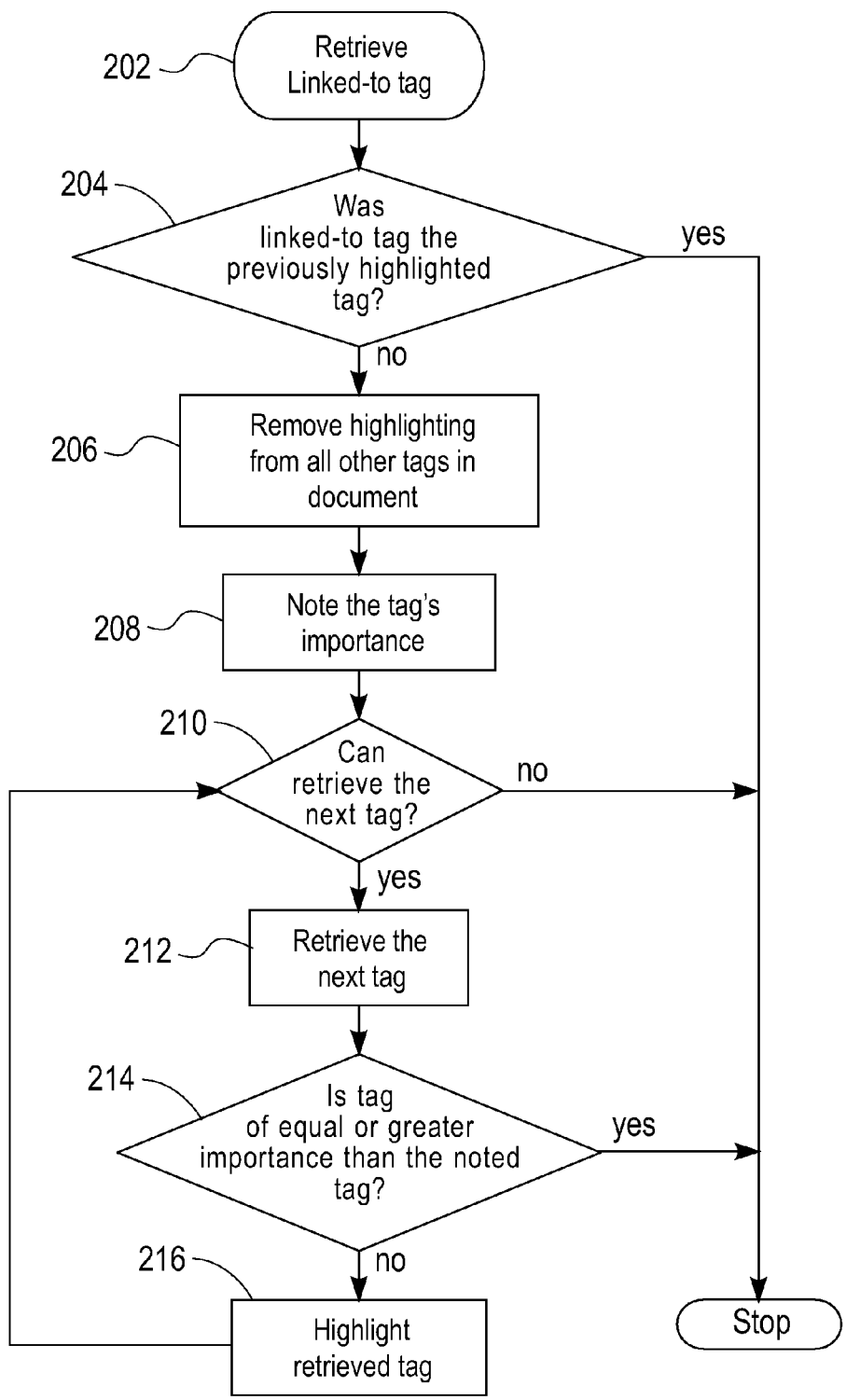
FIG. 2 illustrates a method of highlighting linked-to section in one embodiment.

FIG. 2 illustrates a method of highlighting linked-to section. Once the user clicks on a link internal to the document, the process shown in FIG. 2 is executed by the browser. That is, clicking on a link in the document triggers the steps shown in FIG. 2, which, for instance, may be executed by a browser. Generally, a browser is an application program that provides user interfaces for navigating through and reading files online, for instance, a way to look at and interact with the information on the World Wide Web.

At 202, linked-to tag is retrieved from the hypertext document. At 204, it is determined whether the linked-to tag was a previously highlighted tag. If the linked-to tag was the previously highlighted tag, the process stops, and returns to previous activities. At 206, if the linked-to tag is not the previously highlighted tag, at 206, highlighting is removed from all other tags in the document, if any. At 208, the linked-to tag's importance is noted. Importance, for instance, is determined according to hierarchical rank or position in the hierarchy of tags such as <h1>, <h2>, <h3>, and so on. For example, <h1> is higher than <h2>, <h2> is higher than <h3>, etc. The hypertext document is scanned or read or like, for more tags, also referred to as next tag, appearing after the linked-to tag. At 210, if the next tag cannot be retrieved, the process stops, and returns to previous activities. Otherwise, if the next tag can be retrieved, the next tag is retrieved at 212. At 214, if the next tag retrieved at step 212 is of equal or greater importance than the tag retrieved at step 202, then the process stops, and returns to previous activities. Otherwise, at 216 the next tag retrieved is highlighted.

An advantage of the method of the present disclosure over known alternatives is that the method can be used with simple and unmodified HTML pages or like. This is possible because it only requires standard <h1>, <h2> . . . <h6> tags or like to identify different sections within a page, and then always highlights from the beginning of a newly-linked-to section up to the beginning of the next section that has an equivalent header tag or a header tag which is 'higher' in the tag hierarchy. That is, if linked-to section has header <h2>, highlight everything up to next <h2> or <h1> tag.

This solution is simpler than adding many special tags to designate what highlighting to implement for which elements of the document. The method of the present disclosure instead implements a common default highlighting for any linked-to section of a document. The method of the present disclosure is simpler to implement, for example, because it may use JavaScript and a highlighting style with standard HTML section headers instead of explicitly labeled subsections. The method avoids undesirable complexity and effort by the page designer, and mitigates the problem of lack of support by different browsers (or different versions of the same browser). The method of the present disclosure moves away from the trend for ever-greater HTML source complexity to achieve simpler authoring of documents, and an increased likelihood that a document written by one person/company will be usable by another person/company. A standard or widely support scripting language such as JavaScript may be used to implement the method of the present disclosure.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. A computer-implemented method of automatically highlighting linked-to document sections for increased readability, comprising:

retrieving a linked-to tag in a hypertext document being rendered in response to the linked-to tag being selected;

determining hierarchical rank of the linked-to tag in relation to a hierarchy of tags in the hypertext document;

retrieving next tag appearing after said linked-to tag in the hypertext document and having hierarchical rank equal to or greater than the hierarchical rank of the linked-to tag; and highlighting display section from beginning of said linked-to tag to beginning of said next tag in the hypertext document having hierarchical rank equal to or greater than the hierarchical rank of the linked-to tag, wherein the hypertext document is a standard hypertext document rendered by one or more browsers, said linked-to tag, said next tag, and said hierarchy of tags are standard tags used in said standard hypertext document to identify one or more different sections within said standard hypertext document, and no special tags are needed in the hypertext document to highlight linked-to document sections.

2. The method of claim 1, wherein said hypertext document is an HTML document, and said linked-to tag, said next tag, and said hierarchy of tags are HTML header tags.

* * * * *